United States Patent
Koyama

(10) Patent No.: US 6,449,130 B1
(45) Date of Patent: Sep. 10, 2002

(54) HEAD STACK ASSEMBLY ENABLING INDEPENDENT CONTROL OF A POSITION OF MAGNETIC HEADS FOR ACCESS TO DIFFERENT MAGNETIC DISKS AND SUPPORT METHOD THEREOF

(75) Inventor: Toshisada Koyama, Nagano-ken (JP)

(73) Assignee: Minebea, Co., Ltd., Miyota-machi (JP)

( * ) Notice: Subject to any disclaimer, the term of this patent is extended or adjusted under 35 U.S.C. 154(b) by 8 days.

(21) Appl. No.: 09/594,688

(22) Filed: Jun. 16, 2000

(30) Foreign Application Priority Data

Aug. 5, 1999 (JP) .......................................... 11-222566

(51) Int. Cl.[7] .............................................. G11B 5/55
(52) U.S. Cl. ................................................... 360/264.4
(58) Field of Search ........................... 360/264.4, 264.5

(56) References Cited

U.S. PATENT DOCUMENTS

| | | | | |
|---|---|---|---|---|
| 4,544,972 A | * | 10/1985 | Kogure | 360/264.4 |
| 5,134,532 A | * | 7/1992 | Svendsen | 360/264.4 |
| 5,805,386 A | * | 9/1998 | Faris | 360/264.4 |

* cited by examiner

Primary Examiner—A. J. Heinz
(74) Attorney, Agent, or Firm—Oliff & Berridge PLC

(57) ABSTRACT

A hard disk drive is made small in size, large in storage capacity and high in data reading/writing speed. Two actuator blocks (3) are fixed to a sleeve 16A of a first pivot and sleeve (16B) of a second pivot, respectively. Position of magnetic heads to be accessed to different magnetic disks are controlled independently by the actuator block 3 basis. Therefore, it is possible to distribute the reading/writing processing to the plurality of magnetic disks and perform these processing in parallel, to thereby increase the data reading/writing speed while increasing the storage capacity.

3 Claims, 4 Drawing Sheets

HEAD STACK ASSEMBLY ENABLING INDEPENDENT CONTROL OF A POSITION OF MAGNETIC HEADS FOR ACCESS TO DIFFERENT MAGNETIC DISKS AND SUPPORT METHOD THEREOF

BACKGROUND OF THE INVENTION

1. Field of the Invention

The present invention relates to a head stack assembly (hereafter referred to as "HSA"), that supports a magnetic head which accesses a magnetic disk within a magnetic storage device for computers such as a hard disk drive.

2. Description of the Related Art

Recent rapid progress of miniaturizing personal computers requires rapid development of more miniaturized hard disk drives, etc. which is used as magnetic storage devices for computers. As the processing speed of personal computers is being made higher and higher ever, the required storage capacity of the magnetic storage devices is being increased day by day.

To promote the miniaturization of the hard disk drive, the magnetic disk per se is being decreased in diameter remarkably. In fact, the diameter of the magnetic disk has been changed from 5 inches through 3.5 inches, 2.5 inches, 1.8 inches to 1 inch. The decrease in disk diameter, however, makes it more difficult to increase the storage capacity per one magnetic disk, and accordingly, there arises a need of using a plurality of magnetic disks.

FIG. 4 schematically shows an internal structure of a hard disk drive. A plurality of magnetic disks D are arranged with constant clearances on and along a rotational axis $C_1$, and rotationally driven integrally by a spindle motor not illustrated. Data read/write of the magnetic disks D are carried out by a head stack assembly (HSA) 1. The HSA 1 is provided with a plurality of head suspensions 2 having leading end portions supporting magnetic heads (not shown) thereon. An actuator block 3 is formed by multi-staged suspension supporting portions 3a for supporting the respective head suspensions 2, and rotatably supported by a pivot assembly 4.

The pivot assembly 4 is arranged on a rotational axis $C_2$ parallel to the rotational axis $C_1$, and a shaft 5 is passed through a central portion thereof. The pivot assembly 4 further includes a sleeve 6 supported through a bearing onto the shaft 5. Since the actuator block 3 is fixed with respect to the sleeve 6, the respective head suspensions 2 are made integrally pivotable about the rotational axis $C_2$.

Although not illustrated, a coil is provided in an end portion 3b located opposite from the head suspensions 2 with respect to the rotational axis $C_2$, and magnets are disposed in such a manner that the coil is interposed between the magnets to form a so-called voice coil motor. With the excitation of the voice coil motor, the HSA 1 is pivoted or swung about the rotational axis $C_2$ to move the magnetic head to a desired position on the magnetic disk D.

Since the hard disk drive faces the contradictory demands, i.e. the decreased size and the increased storage capacity as discussed above, the hard disk drive is required to have a multi-staged arrangement of the magnetic disks D. That is, three to ten magnetic disks D are stacked as required, and the suspension supporting portions 3a of the actuator block 3 are multi-staged more correspondingly to support a larger number of the head suspensions 2 (and the magnetic heads).

The multi-stage arrangement of the magnetic disks D however causes the following new problem. That is, although the storage capacity can be increased in association with the multi-stage arrangement of the magnetic disks D, the data read/write speed, which is one of the requirements for the hard disk drive, can not be increased correspondingly to the increased storage capacity. This is because the head suspensions 2 are all pivoted integrally, and thus the magnetic heads supported by the respective head suspensions 2 are all moved integrally on the disks D, that is, the reading/writing cannot be performed to each of the plurality of magnetic disks in parallel or concurrently.

SUMMARY OF THE INVENTION

The present invention has been made in order to solve the above-mentioned problem, and an object thereof is to realize a magnetic storage device for computers such as a hard disk drive, to meet all the requirements, i.e. miniaturization in size, the increased capacity, and the increased data reading/writing speed, thereby enhancing more performance of the magnetic storage device for computers.

To achieve the above-noted object, a head stack assembly according to a first aspect of the present invention is arranged to have a pivot assembly provided with a plurality of pivots that support a plurality of actuator blocks supporting head suspensions so as to be independently rotatable while being arranged such that rotational axes thereof are made in series.

With this arrangement, the plurality of actuator blocks supporting the head suspensions are rotated one by one using the plurality of pivots, making it possible to independently control a position of the magnetic heads for access to different magnetic disks.

The head stack assembly according to a second aspect of the present invention is arranged such that the plurality of pivots are rotatably supported to a common shaft. Therefore, the shaft, the plurality of pivot assemblies pivotally-supported to the shaft, the actuator blocks pivotally-supported to the respective pivot assemblies, and the suspension heads supported to the respective actuator blocks can be formed as a module.

The head stack assembly according to a third aspect of the present invention is arranged such that the sleeves are supported through bearings to the shaft, and a spacer is disposed between two adjacent sleeves. With this arrangement, a setting clearance between the actuator blocks fixed to the respective sleeves is held properly, and a desired pre-load is applied to the bearings located inside the pivot assembly.

To achieve the above-noted object, a supporting method of a head stack assembly according to a fourth aspect of the present invention is arranged such that a plurality of actuator blocks supporting head suspensions are supported so as to be independently rotatable, while being arranged such that rotational axes thereof are made in series. With this arrangement, position of the magnetic heads to be accessed to different magnetic disks is controlled independently by the actuator-block-basis.

DETAILED DESCRIPTION OF THE PREFERRED EMBODIMENTS

Figure 1:
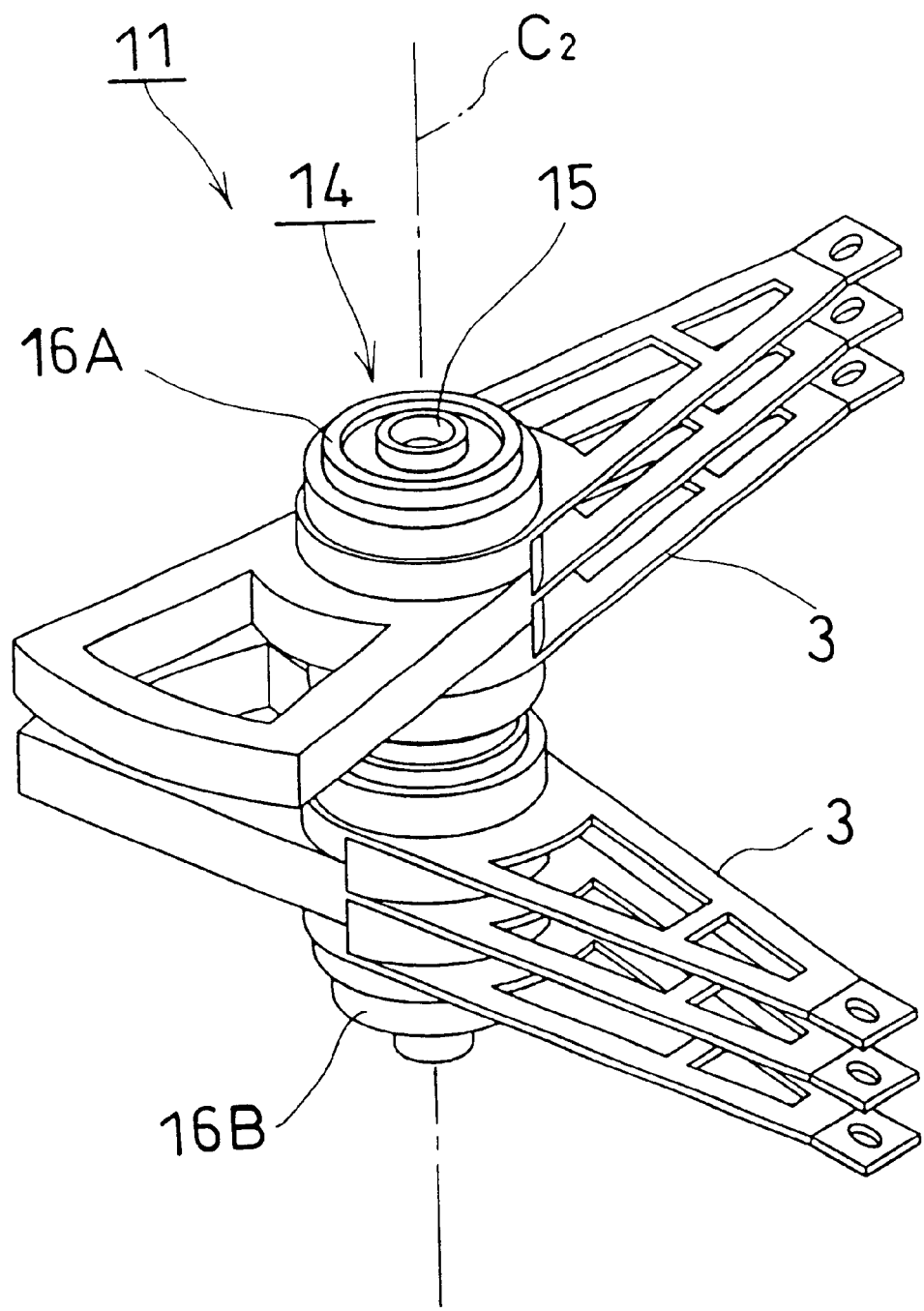
FIG. 1 is a perspective view showing a major part of a head stack assembly according to an embodiment of the present invention.

Hereafter, an embodiment of the present invention will be described with reference to the accompanying drawings. In the description, portions the same as or corresponding to portions described with reference to the related art are denoted by the same reference numerals, and thus detailed description therefor is omitted here.

Figure 2:
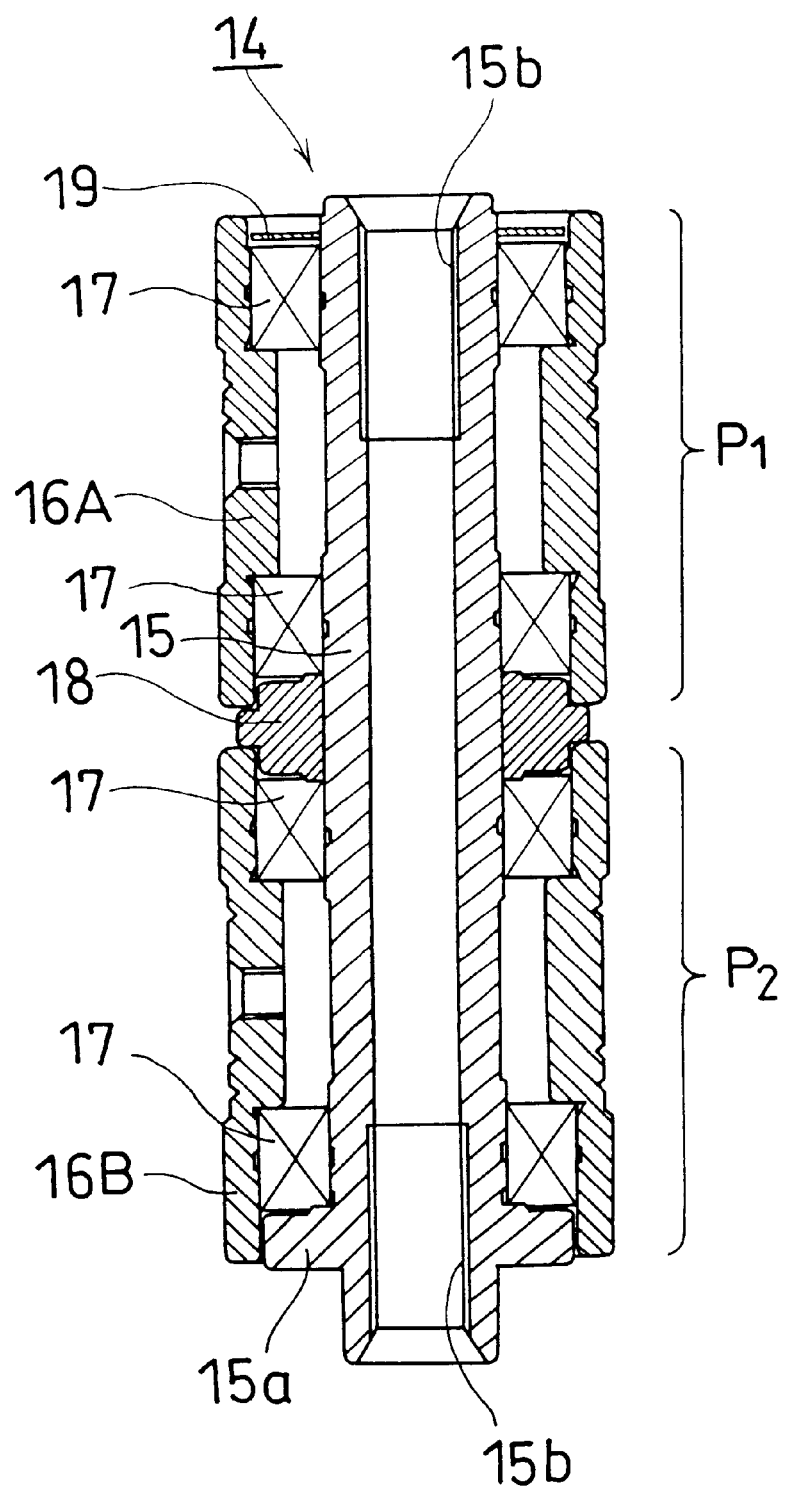
FIG. 2 is a sectional view showing a pivot assembly of the head stack assembly shown in FIG. 1.

FIG. 1 shows a major part of a head stack assembly (HSA) 11 according to an embodiment of the present invention. FIG. 2 is a sectional view showing a pivot assembly 14 of the HSA 11. The pivot assembly 14 includes a first pivot $P_1$, which has a sleeve 16A supported through bearings 17 onto a shaft 15, a second pivot $P_2$, which has a sleeve 16B supported through bearings 17 onto the shaft 15, and a spacer 18 interposed between the sleeves 16A and 16B. The bearing 17 is preferably in the form of a radial ball bearing. The spacer 18 is brought into contact with inner race member (not shown) of the bearings 17 to properly keep a setting clearance between the first and second pivots $P_1$ and $P_2$.

The lower bearing 17 in the second pivot $P_2$ in FIG. 2 is brought into contact with a flange portion 15a formed on the shaft 15. This makes it possible to apply desired pre-loads onto the respective bearings 17 by applying an axial load onto an inner race member (not shown) of the upper bearing 17 in the first pivot $P_1$ in FIG. 2. The shaft 15 is formed as a hollow shaft, and female threads 15b are formed on both ends thereof to ease the fixing of the shaft 15. The portion designated by reference numeral 19 is a hub cap provided for the purpose of preventing particles from entering into the interior of the pivot assembly 14, and preventing dusts from being discharged outside the pivot assembly 14.

As shown in FIG. 1, actuator blocks 3 are respectively fixed to the sleeves 16A and 16B of the first and second pivots $P_1$ and $P_2$ so that the actuator blocks 3 are independently rotatable, while being arranged such that the rotational axes thereof are arranged in series.

The embodiment of the present invention thus constructed provides the following effects: First of all, since the two actuator blocks 3 are supported such that one is independently rotatable to the other, the position of the magnetic heads to be accessed to different magnetic disks can be controlled independently by the actuator block 3 basis. Therefore, it is possible to distribute the reading/writing processing to the plural magnetic disks and perform these processing in parallel, to thereby increase the data reading/writing speed while increasing the storage capacity. If two actuator blocks 3 are provided as in the embodiment of the present invention, the data reading/writing speed becomes roughly as twice as fast in comparison to the conventional art in which all of the magnetic heads are supported by a single actuator block.

Since the first and second pivots $P_1$ and $P_2$ are supported rotatably onto the common shaft 15, the shaft 15, the pivot assembly 14, the actuator blocks 3 rotatably supported to the pivot assembly 14, and head suspensions 2 supported to the respective actuator blocks 3 can be formed as a module. Accordingly, even if the number of magnetic heads, the head suspensions 2, etc, are increased in association with the increase in number of multiple-stages of the magnetic disks D, there arises no inconvenience in handling during assembly.

As to the shaft 15, two independent shafts respectively for the first and second pivots $P_1$ and $P_2$ arranged in series may be employed, in order to allow the two actuator blocks 3 to be rotated independently in a state that their rotational axes are arranged in series. The use of the independent shafts makes it easier to change the setting clearance between the first and second pivots $P_1$ and $P_2$, and accordingly the shaft arrangement or structure is preferably selected depending on the internal structure of the hard disk drive or the like.

Further, the provision of the spacer between the sleeves 16A and 16B supported through the bearings 17 onto the shaft 15 properly holds the setting clearance between the actuator blocks 3 fixed to the respective sleeves 16A and 16B, and enables the application of desired pre-loads to the bearings located inside the pivot assembly 14. This makes it possible to provide HSA 11 with high operational accuracy.

Figure 3:
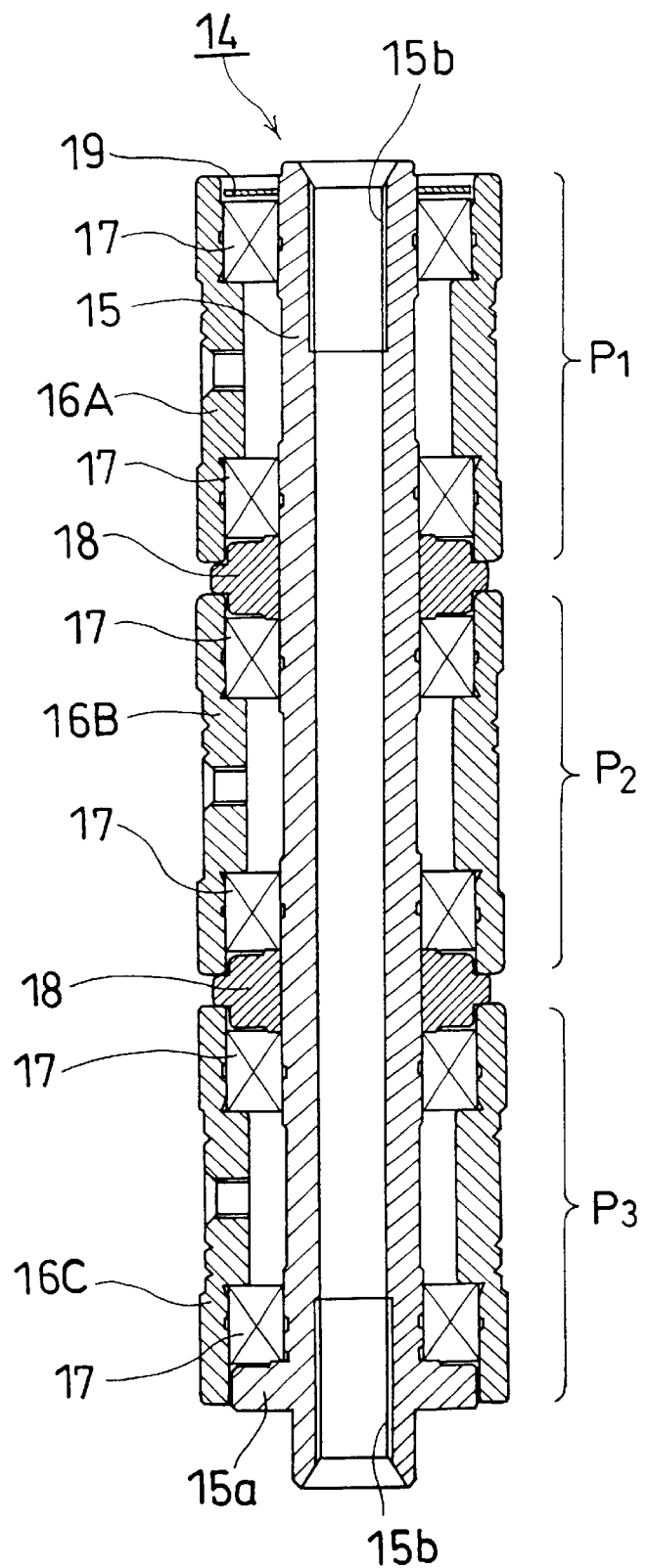
FIG. 3 is a sectional view showing a modified example of the pivot assembly shown in FIG. 2.

The above description is directed to an example in which the pivot assembly 14 has two pivots $P_1$ and $P_2$. As shown in FIG. 3, first, second and third pivots $P_1$, $P_2$ and $P_3$ may be provided such that the third pivot $P_3$ has a sleeve 16C supported through the bearings 17 onto the shaft 15, and another spacer 18 is disposed between the sleeves 16B and 16C. That is, the invention can freely cope with the multiple-staged magnetic disks D. On an account of practical use, the pivot assembly 14 in which five pivots are stacked can be constructed.

Figure 4:
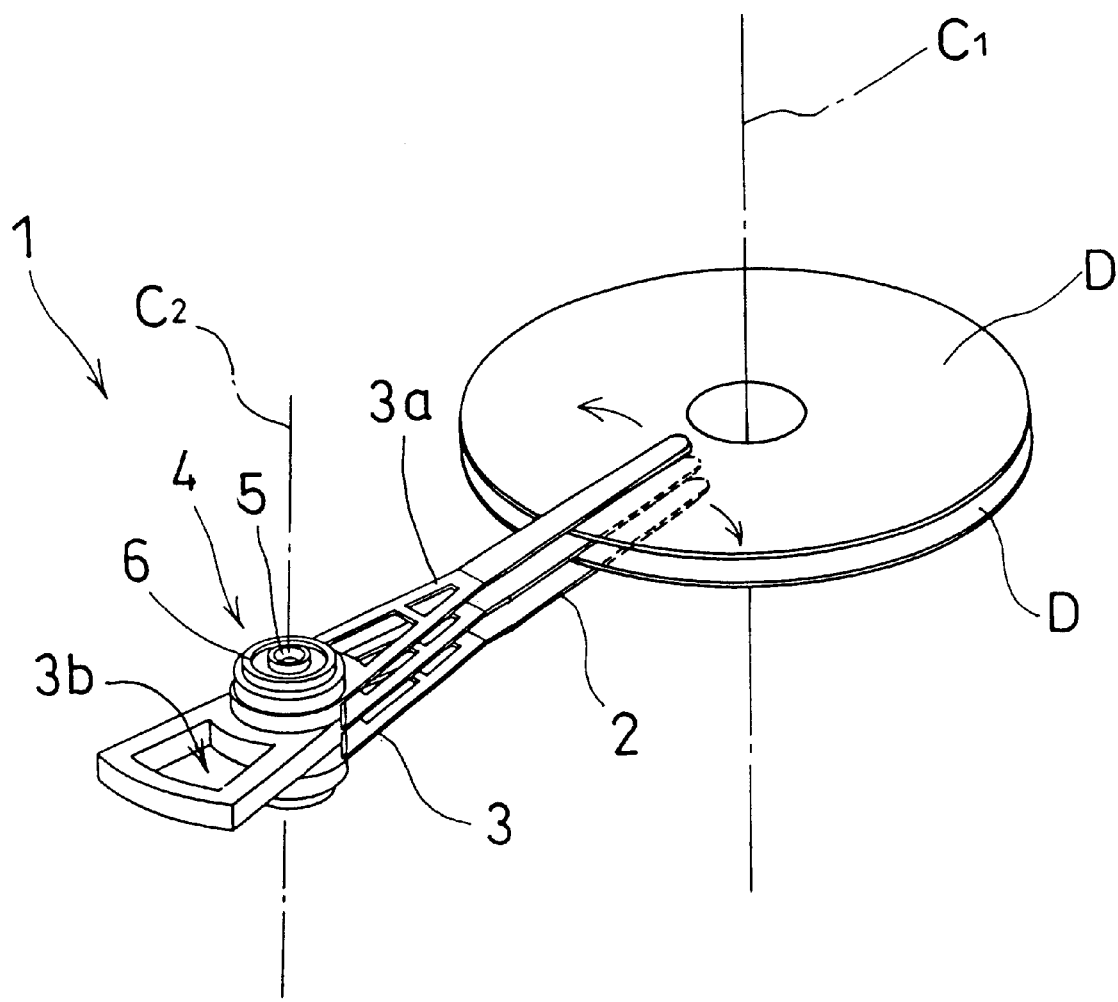
FIG. 4 is a perspective view schematically showing an internal structure of a conventional hard disk drive.

The above description is directed to an example in which the actuator block 3 is constructed to have multiple-staged suspension support portions 3a (FIG. 4) for supporting the head suspensions 2. The actuator block 3 may have a single suspension support portion 3a. In this case, by making the axial thickness of each actuator block 3 thin, the respective head suspensions 2 can be pivoted independently while the entire length of the pivot assembly 14 can be made substantially equal to the conventional pivot assembly 4 shown in FIG. 4.

Since the present invention is constructed as mentioned above, the following effects can be obtained. First of all, according to a first aspect of the present invention, it is possible to realize a magnetic storage device for computers such as a hard disk drive, to meet all the requirements, i.e. miniaturization in size, the increased capacity, and the increased data reading/writing speed. Therefore, it is possible to enhance the performance of the magnetic storage device for computers.

According to a second aspect of the present invention, even if the number of magnetic heads, the head suspensions, etc, are increased in association with the increase in the number of multiple-stages of the magnetic disks, the reading speed can be made faster, and there arises no inconvenience in handling during assembly.

According to a third aspect of the present invention, it is possible to provide a head stack assembly with high operational accuracy.

According to a fourth aspect of the present invention as well, it is possible to realize a magnetic storage device for computers such as a hard disk drive, to meet all the requirements, i.e. miniaturization in size, the increased capacity, and the increased data reading/writing speed. Therefore, it is possible to enhance the performance of the magnetic storage device for computers.

What is claimed is:
1. A head stack assembly, comprising:
 a pivot assembly provided with a plurality of pivots that support a plurality of actuator blocks supporting head suspensions so as to be independently rotatable, while being arranged so that rotational axes thereof are made in series;

sleeves supported through bearings to the shaft; and a spacer having an inner circumference that is abutted to an inner race of each bearing, the spacer also having an outer circumference that is positioned between the sleeves.

2. The head stack assembly as claimed in claim 1, wherein the plurality of pivots are axially supported to a common shaft.

3. A supporting method of a head stack assembly, comprising:

supporting a plurality of actuator blocks that support head suspensions so as to be independently rotatable while being arranged such that rotational axes thereof are made in series;

supporting sleeves through bearings to the shaft; and abutting an inner circumference of a spacer to an inner race of each bearing while an outer circumference thereof is positioned between the sleeves.

* * * * *